(12) United States Patent
Lakhansingh

(10) Patent No.: US 7,072,569 B2
(45) Date of Patent: Jul. 4, 2006

(54) PORTABLE ENTERTAINMENT DEVICE

(76) Inventor: Cynthia Lakhansingh, 401 W. 47th St., Apt. 12, New York, NY (US) 10036

(*) Notice: Subject to any disclaimer, the term of this patent is extended or adjusted under 35 U.S.C. 154(b) by 1334 days.

(21) Appl. No.: 09/811,957

(22) Filed: Mar. 19, 2001

(65) Prior Publication Data

US 2002/0131759 A1    Sep. 19, 2002

(51) Int. Cl.
  *H04N 5/91* (2006.01)
(52) U.S. Cl. ................ 386/46; 46/83; 725/62
(58) Field of Classification Search .......... 386/45, 386/46, 95, 125, 126; 725/62, 81, 134, 131, 725/139, 151
  See application file for complete search history.

(56) References Cited

U.S. PATENT DOCUMENTS

| | | | |
|---|---|---|---|
| 4,713,801 A | 12/1987 | Hale | |
| 4,937,807 A | 6/1990 | Weitz et al. | |
| 5,126,982 A | 6/1992 | Yifrach | |
| 5,195,065 A | 3/1993 | Kato et al. | |
| 5,235,568 A | 8/1993 | Masauru | |
| 5,448,534 A | 9/1995 | Okada | |
| 5,568,453 A | 10/1996 | Okada | |
| 5,633,837 A | 5/1997 | Gantt | |
| 5,684,918 A * | 11/1997 | Abecassis | 386/46 |
| 5,790,423 A * | 8/1998 | Lau et al. | 725/134 |
| 6,041,023 A | 3/2000 | Lakhansingh | |
| 6,157,935 A * | 12/2000 | Tran et al. | 715/503 |
| 6,182,126 B1 * | 1/2001 | Nathan et al. | 725/134 |
| 6,194,992 B1 * | 2/2001 | Short et al. | 340/5.9 |

* cited by examiner

*Primary Examiner*—James J. Groody
*Assistant Examiner*—Christopher Onuaku
(74) *Attorney, Agent, or Firm*—Norris,McLaughlin & Marcus (57) ABSTRACT

A portable entertainment apparatus is provided for writing onto a compact disk and other permanent storage medium. A touch sense screen is used to display and select menu graphics choices such as to listen to the radio or a CD, save selections, etc. The apparatus provides a display of all selections stored in its memory so that one may choose favorite music selections and their order of play, play a video game and a DVD movie.

15 Claims, 9 Drawing Sheets

PORTABLE ENTERTAINMENT DEVICE

BACKGROUND OF THE INVENTION

1. Field of the Invention

The present invention relates generally to personal entertainment devices. More particularly, the invention comprises a portable entertainment device having a microcomputer interfaced with a plurality of a radio receiver, a scanner, a read/write CD, a database search engine, a mouse, a touch sense circuit screen, and a data storage area.

2. Description of the Related Art

The following art defines the present state of this field:

Hale, U.S. Pat. No. 4,713,901 describes an audio device for automotive use in which radio transmissions can be received and directly recorded on magnetic tapes, cassettes or disks. The device includes an in-dash combination AM-FM radio receiver and tape or cassette deck, which is specially adapted to permit direct recording of radio transmissions on blank tape cartridges or cassettes. The device of this invention is not well adapted for portable use which would require it to be carried on the person.

Weitz et al., U.S. Pat. No. 4,937,807 describes a method and device for addressable digital representations of high-fidelity sound recordings in a non-mapped digital storage device, such as a CD music ROM, using conventional PCM (pulse code modulated) equipment, but in a more condensed and efficiently sampled ADM (adaptive delta modulated) format thereby providing high-density addressable storage of several thousand recordings in a single music ROM jukebox as well as high-speed information transfers. The invention enables communication and control links between a conventional digital audio processor and a conventional microcomputer. Timing data is embedded in the ADM formatted and blocked data file. The microcomputer is utilized for editing ADM data, inserting catalog data, and transferring the data file to a standard PCM file writer suitable for making non-mapped CD music ROMs containing addressable ADM data files on conventional equipment utilized in the industry. Encoding is performed by Dolby delta-link ADM encoding to achieve time-domain condensation of information content and analog signals representing the sound recording reduction techniques. CD music ROMs produced thereby are utilized in high-speed reproduction systems or for addressable computer access in high-volume archival storage systems. The device of this invention is not intended for portable use and is not intended to be carried by a person.

Gantt, U.S. Pat. No. 5,633,837 describes an automobile recorder allowing a user to continuously record the contents of radio programs onto a solid state memory and then transfer selected portions to a cassette tape or recorded compact disk. The auto recorder prevents unnecessary wear on the tape mechanism and tape by requiring use of these only when the tape transfer is made or the tape is being played back. A second optional AM/FM tuner allows the user to listen to one program while recording another program onto the solid state memory. Again, this device is not intended to be portable and so carried by an individual.

Okada, U.S. Pat. Nos. 5,568,453 and 5,448,534 both describe a radio system having a detector for detecting a required radio program and supplying an instruction signal when the program is detected. In accordance with the instruction signal, a recording unit begins to record the program. Each of the disclosed devices records sound received by a radio onto mini-disks, thus the overall capacity is not as great as might be desired.

Massaru, U.S. Pat. No. 5,235,568 describes a combined system for commonly controlling a compact disk changer player and a radio receiver having a plurality of memory/call switches for selectively operating the compact disk changer player and the radio receiver under the control of a microcomputer; and a radio/compact disk changeover switch, for selectively playing back a user's desired disk and track. In the control method of the combined system for commonly controlling the compact disk changer player and the radio receiver, the first and second inputs of the memory/call switches coincide with a ten's place number corresponding to a track number receptively and a radio frequency changeover data is generated to operate the radio receiver when the radio/compact disk changeover switch is switched to the radio receiver, while a disk number changeover data are generated to operate the compact disk changer player when the radio/compact disk changeover switch is switched to the compact disk. The device of this invention does not record anything. The microcomputer is used merely to select the source of what is to be played through the amplifier.

Yifrach, U.S. Pat. No. 5,126,982 describes a buffer system for radio receivers which includes a cyclic storage device connectable to a demodulator circuit for continuously storing the audio signals last outputted thereby only over a predetermined time interval, enabling the listener to jump-back to hear a preceding portion of the radio broadcasts. In one described embodiment, the listener normally hears the broadcasts in a real-time manner but may depress a button to hear the broadcasts in a delayed-time manner via the cyclic storage device. In a second described embodiment, the listener normally hears the broadcasts in a real-time manner, and may depress a button to freeze a part of the broadcast in another storage device, and may later depress another button to play back the portion frozen. The described device has a storage capacity which allows sixty seconds of sound storage and would not be suitable for storing multiple musical selections.

Kato et al., U.S. Pat. No. 5,195,065 describes a function setting method for an audio system which is capable of changing a function of the audio system without alteration of the hardware of a system controller and is superior in general use. The method comprises the steps of preparing, as the system controller for controlling functions incorporated in the audio system in a concentrated manner, a microcomputer which has an analog/digital conversation input port and has built therein control programs for all of a plurality of functions which can be incorporated in the audio system, and applying a selected one of a plurality of analog voltages which individually represents possible combinations of the functions including the individual functions to the analog/digital conversation input port of the microcomputer to cause the microcomputer to be prepared for at least one of the functions represented by the analog voltage. The device of the Kato et al invention is designed for use in an automobile, and is so designed that the operating system of the device will be removed by the owner to disable the remainder of the system and thus deter theft. This complete device is not intended to be carried by an individual. Also, this device does not record anything coming into it from any of its sources.

As seen from the above descriptions, the prior art teaches the use of devices for storing and playback of digitally processed information. However, the prior art does not teach that a portable entertainment device may be controlled with a screen displayed menu program for playing, storing, editing, archiving and retrieving audio and video information. The present invention fulfills these needs and provides further related advantages as described in the following summary.

SUMMARY OF THE INVENTION

The present invention teaches certain benefits in construction and use which give rise to the objectives described below.

The present invention provides a portable entertainment device enabled for writing onto a microcomputer hard drive or other permanent storage medium. A touch sense screen is used to display and select most choices, but mode selection such as AM radio band, FM radio band, and CD, is accomplished by using a multifunctional mechanical switch located on the case of the device. Volume control is also a mechanical control in the form of a finger-adjustable knob. The device provides a display of all selections stored in its memory so that one may choose favorite music selections and their order of play.

A primary objective of the present inventions is to provide an entertainment device having advantages of portability, ease of use, large storage capacity, and versatility.

Another objective is to provide such a portable entertainment device capable of recording selections from radio broadcasts as well as tracks from commercial CD devices.

A still further objective is to provide such a portable entertainment device having a touch sense monitor display capable of displaying the contents of the stored memory so as to allow the user to select music and other material for entertainment, such as video games, DVD movies or scanned information.

The invention is simple, ease to us, and is economical to manufacture. The invention provides improved elements and arrangements thereof in a device for the purposes described which is inexpensive, dependable and fully effective in accomplishing its intended purposes.

DESCRIPTION OF THE PREFERRED EMBODIMENT

For a fuller understanding of the nature and desired objects of this invention, reference should be made to the following detailed description taken in connection with the accompanying drawings.

Referring to the drawings wherein like reference numerals designate corresponding parts throughout the several figures, reference is made to FIGS. 1 through 9 which illustrate various components of the present invention which is a portable entertainment device 10. The device 10 comprises a means 12 for receiving electromagnetic wave energy signals and for converting the signals into digital data signals, such as a common AM/FM radio receiver with an audio signal to digital signal converting circuit as is well known in the art, The device contains a digital reading and writing means 14 for reading and writing on a compact disk 16 and for digitally reading a video game disk 18, and a DVD movie disk 20. The means 14 is of any well known design which is currently commercially available in the consumer electronics field.

The device contains a means 22 is for displaying and selecting video information using menu graphics, such as a cathode ray tube, thin film transistor or a liquid crystal display with a touch sense screen of any well known type. The device contains a means 24 for producing an audio output, such as an amplifier 26 and a pair of stereo loudspeakers 28.

The device further contains means 30 for storing digital data present on the compact disk 16, the video game disk 18 and the DVD movie 20. This means 30 is a magnetic domain storage hard drive or read-write compact disk read and write memory device or other memory device.

Figure 1:
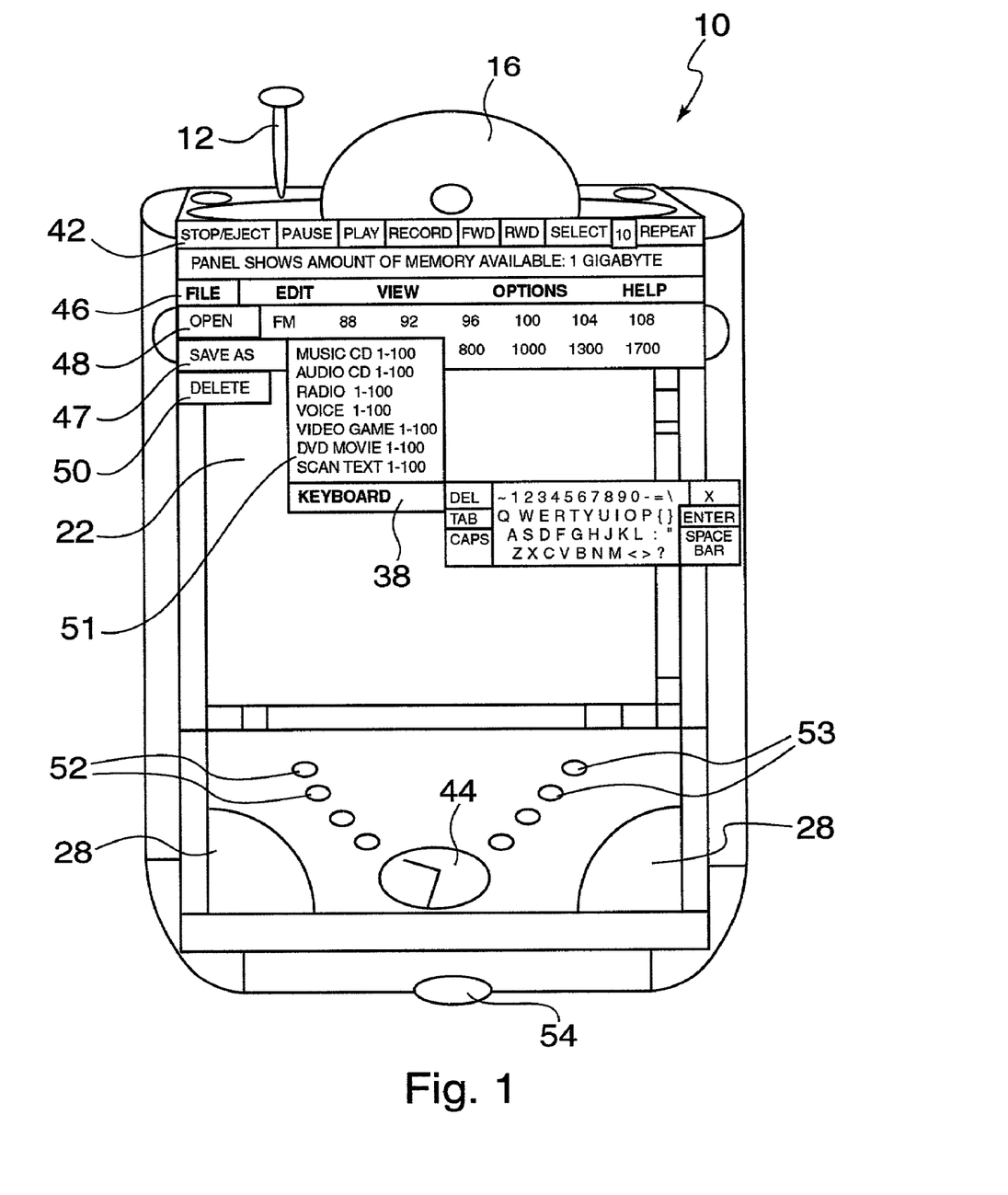
FIG. 1 is a front diagrammatic perspective view of the device of the present invention showing a compact disk being inserted therein.
Figure 2:
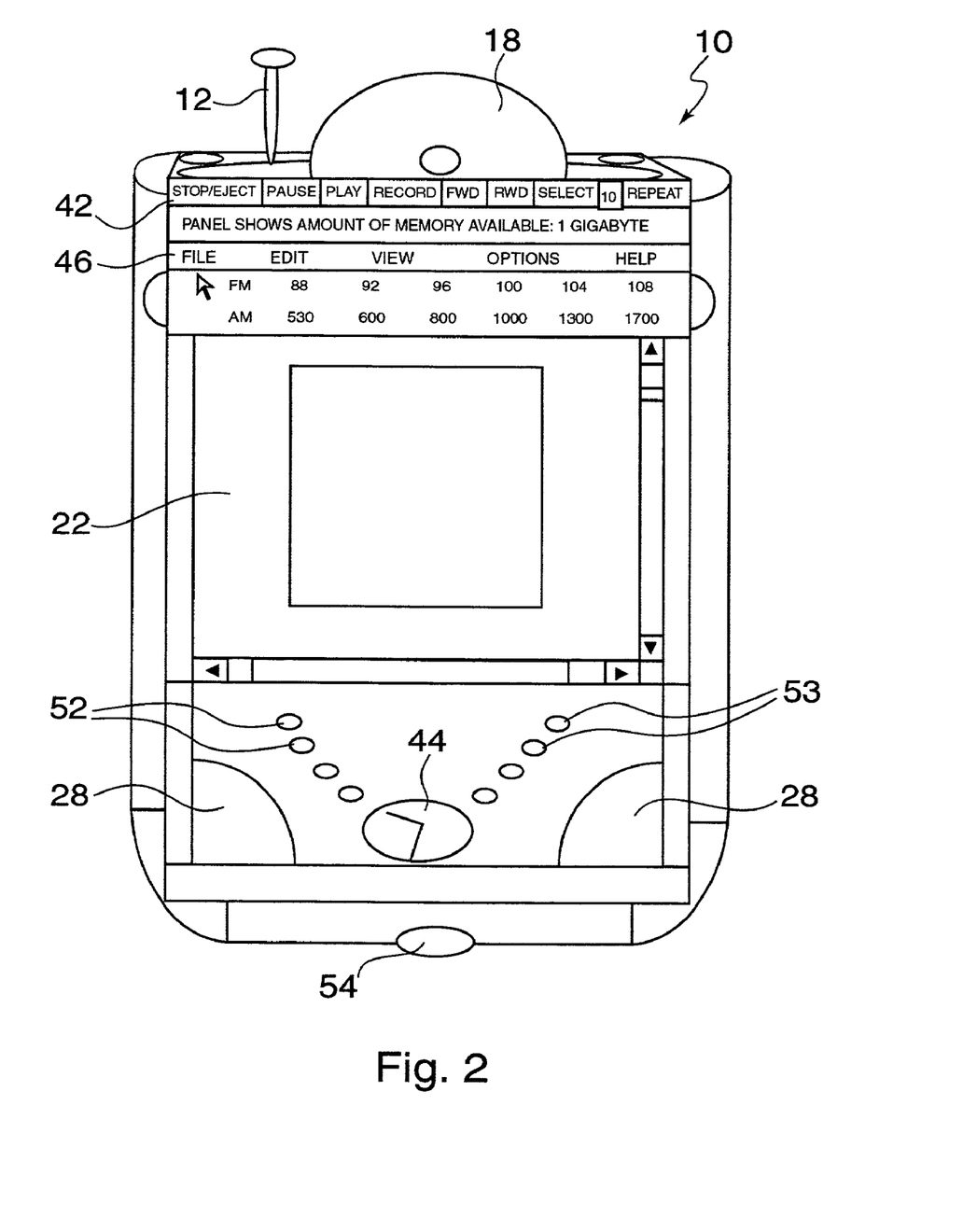
FIG. 2 is a front diagrammatic perspective view similar to FIG. 1, showing a video game disk being inserted therein.
Figure 3:
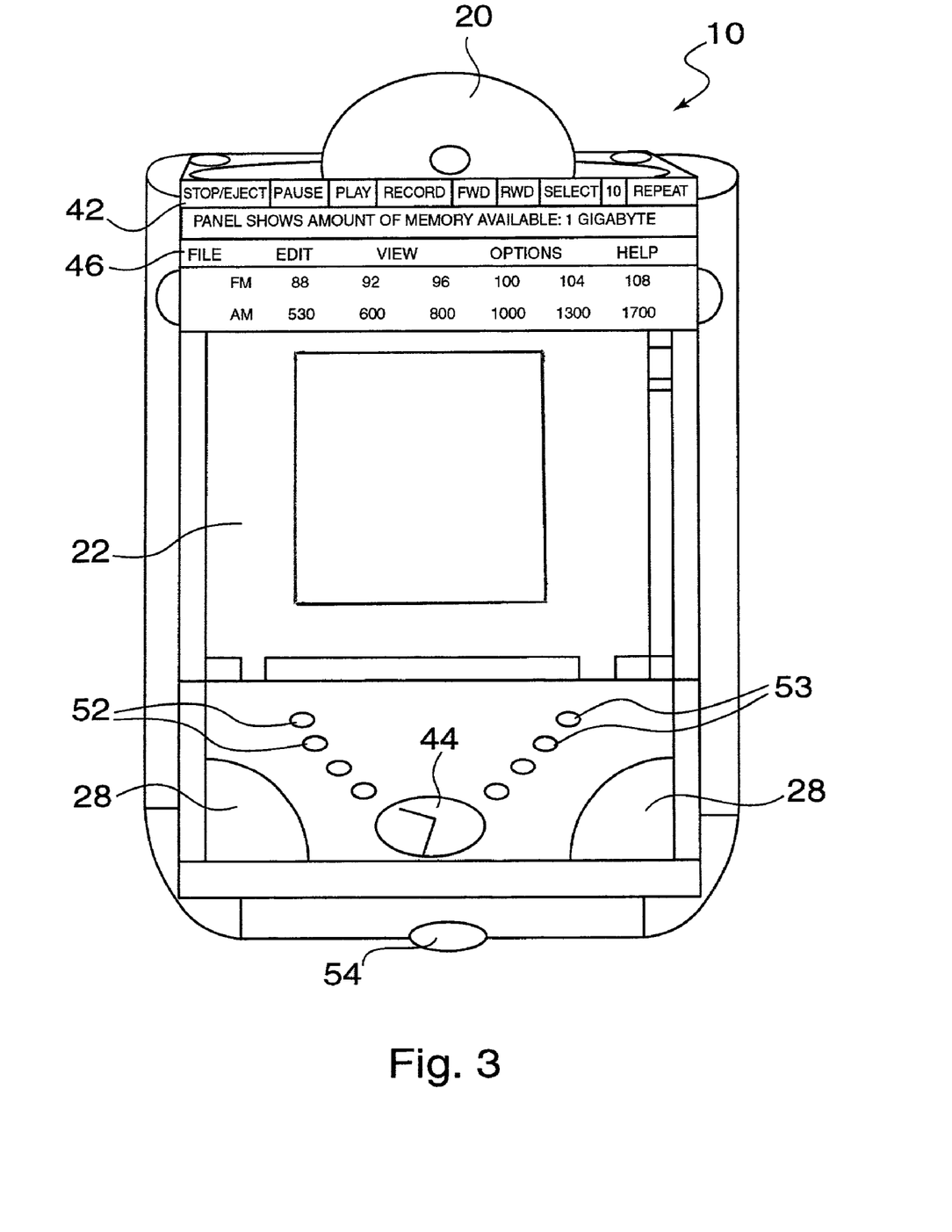
FIG. 3 is a front diagrammatic perspective view similar to FIG. 2, showing a DVD movie disk being inserted therein.
Figure 4:
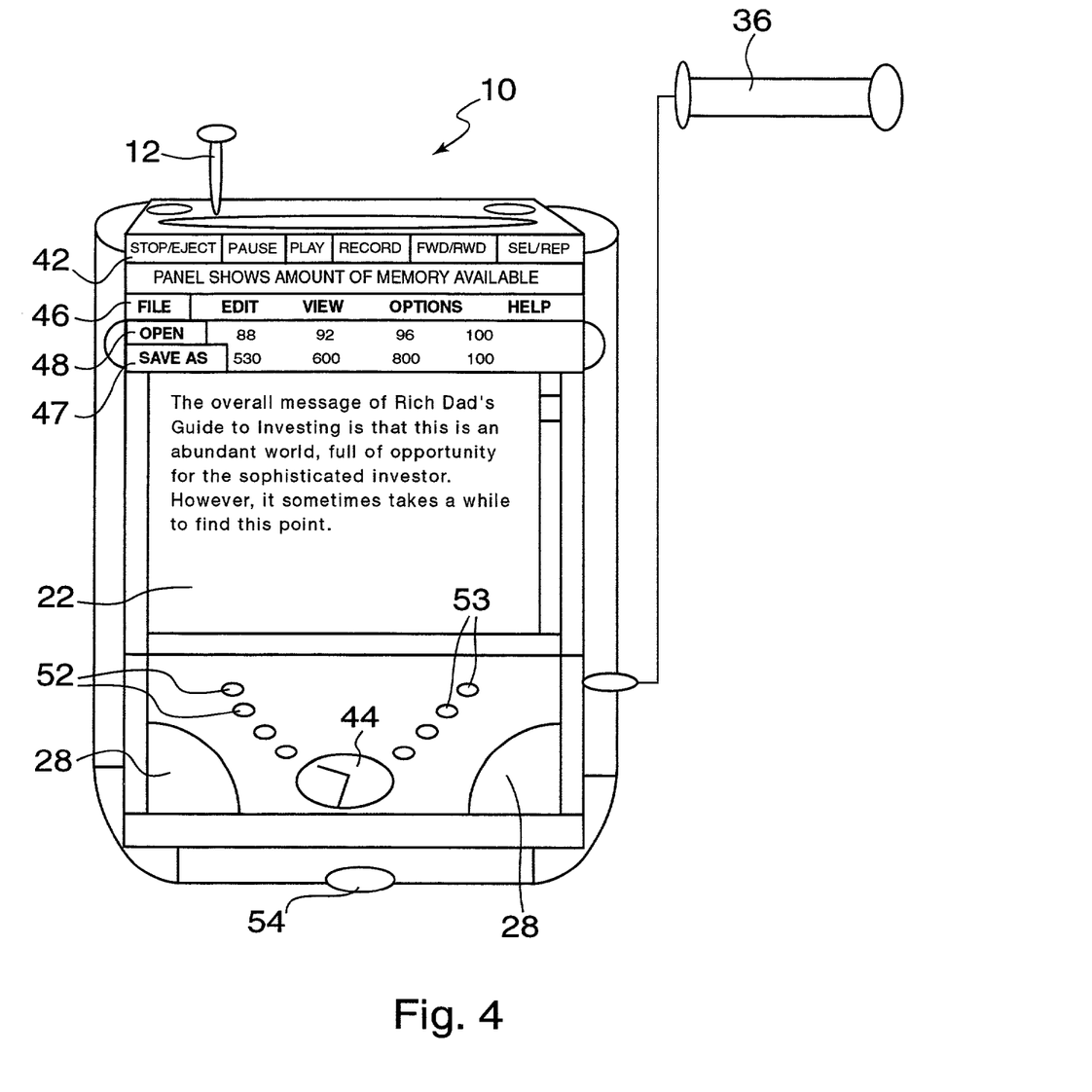
FIG. 4 is a front diagrammatic perspective view similar to FIG. 3, showing a small portable hand-held scanner connected thereto.
Figure 5:
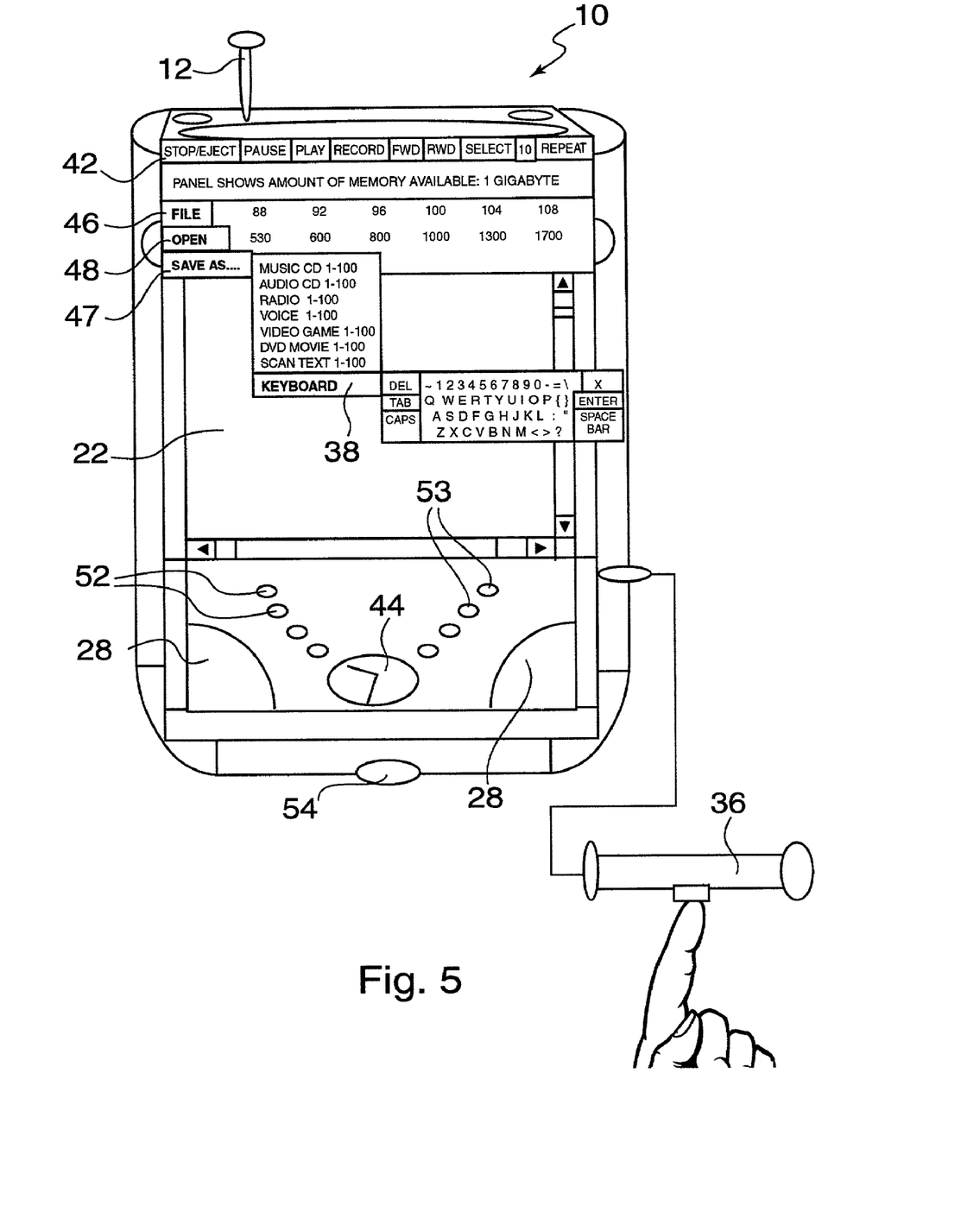
FIG. 5 is a front diagrammatic perspective view similar to FIG. 4, showing how to turn on the small portable hand-held scanner.
Figure 6:
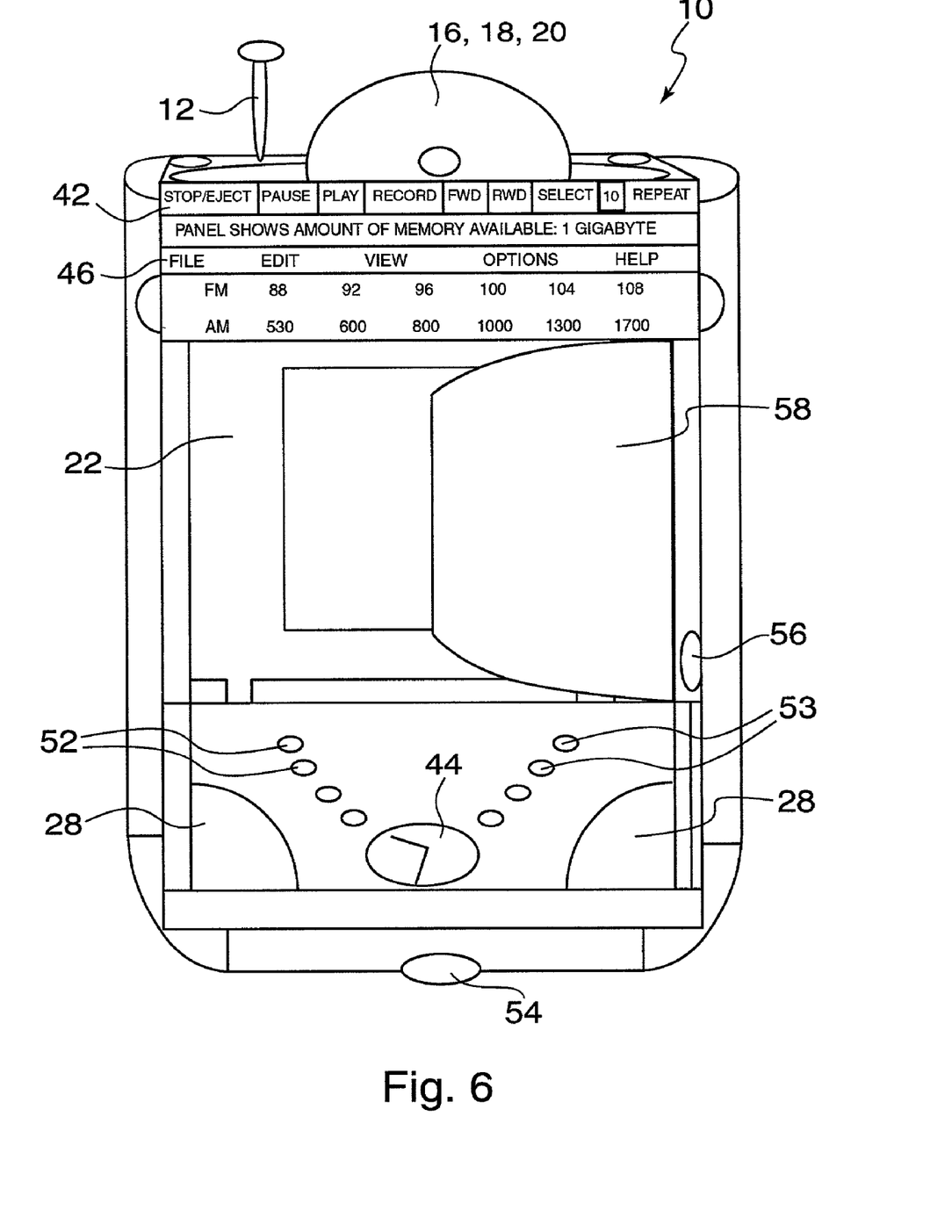
FIG. 6 is a front diagrammatic perspective view similar to FIG. 5, showing a built-in cover partially extending over the liquid crystal display screen.
Figure 7:
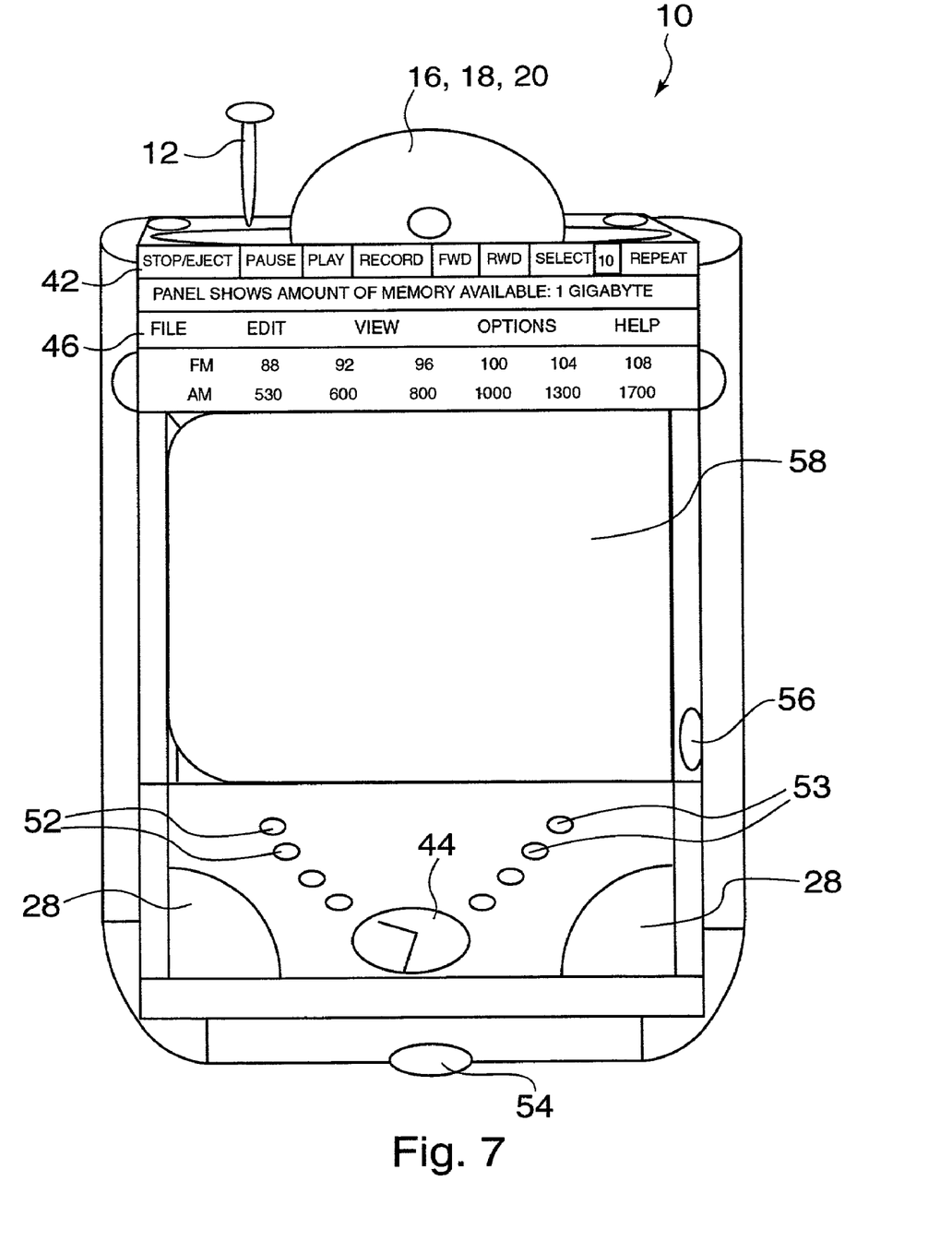
FIG. 7 is a front diagrammatic perspective view similar to FIG. 6, showing the built-in cover totally extending over the liquid crystal display screen.
Figure 8:
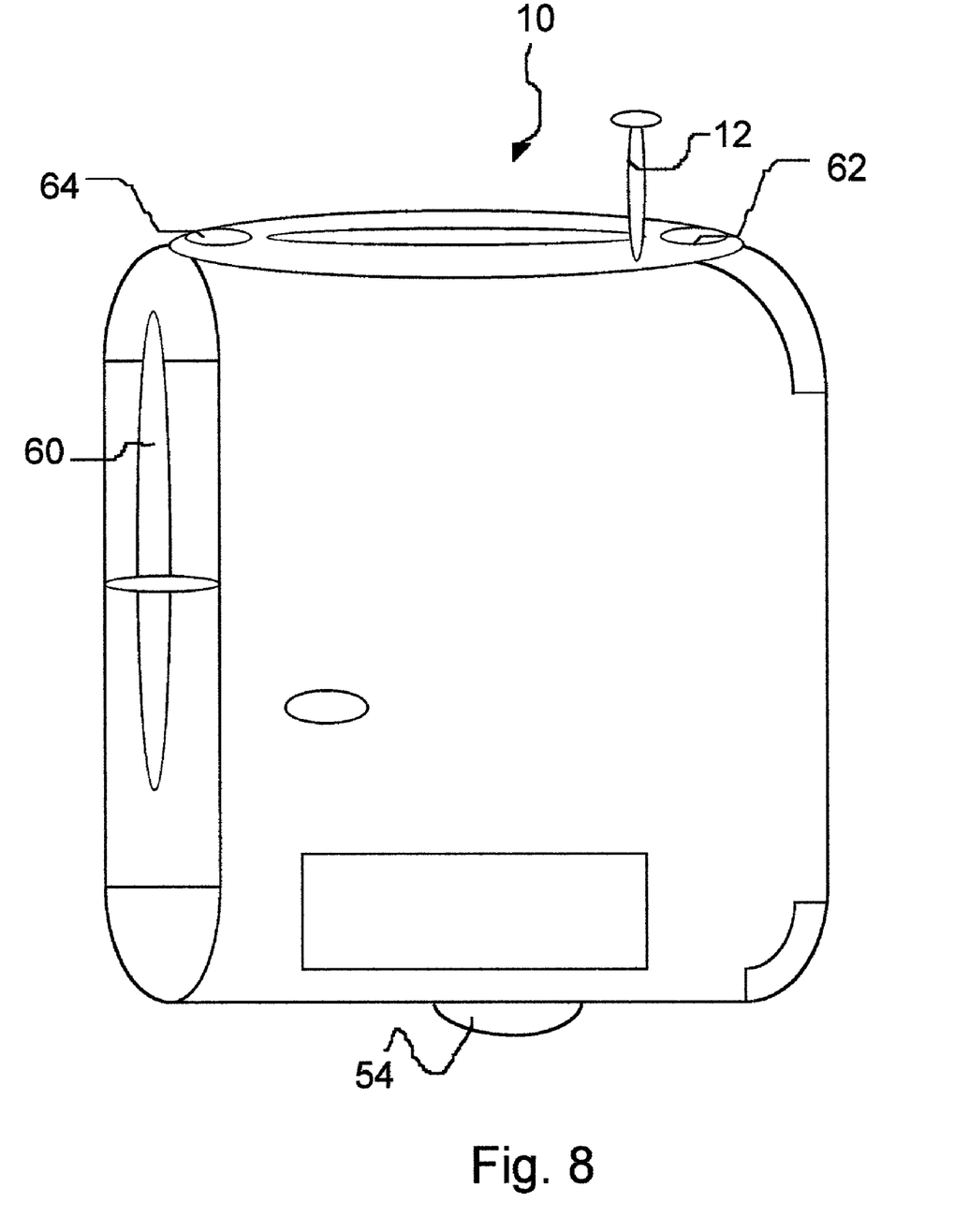
FIG. 8 is a rear diagrammatic perspective view of the device of the present invention.
Figure 9:
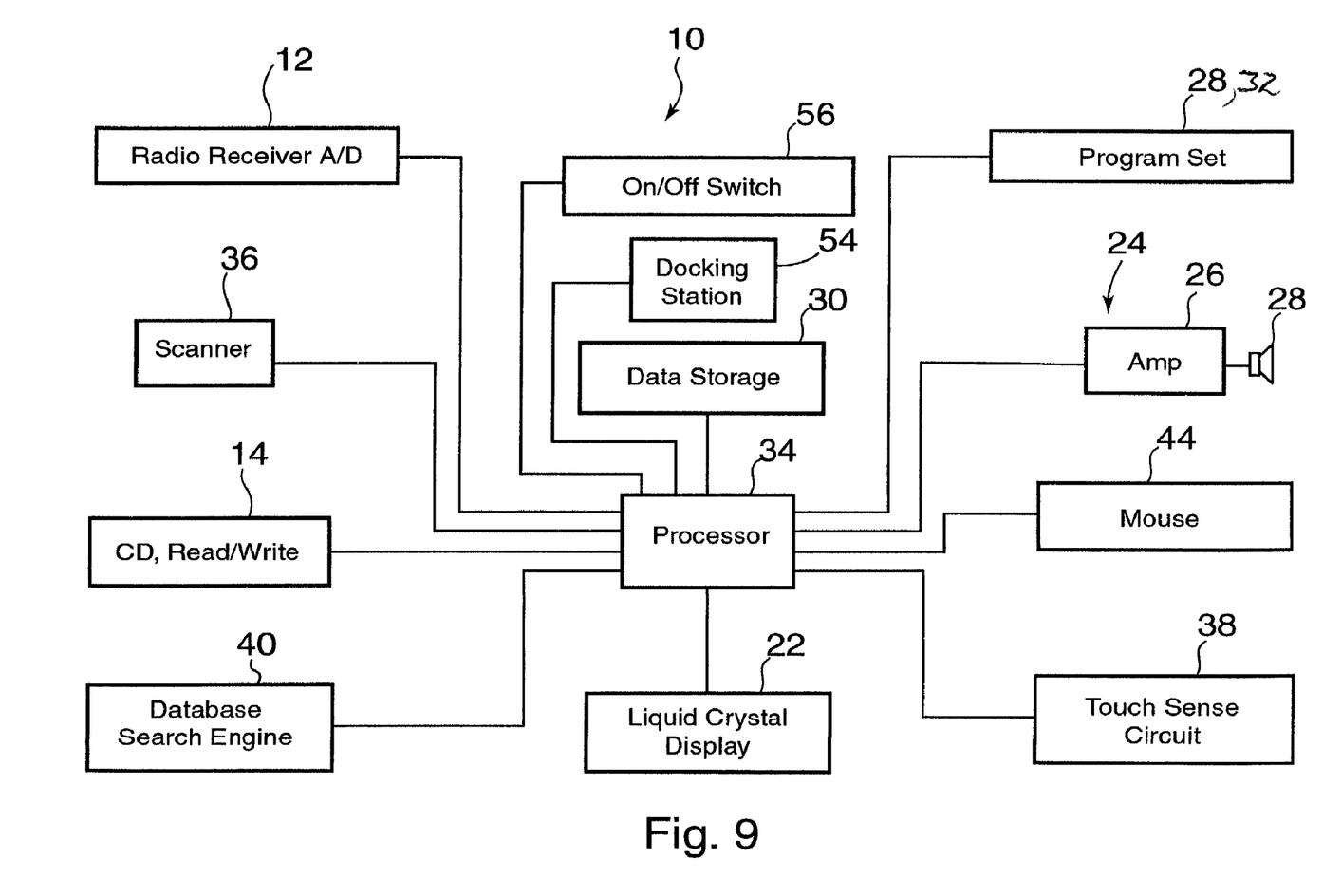
FIG. 9 is a block diagram showing the various electrical components and their relationship in the device of the present invention.

A data processing program is within the digital data storing means 30, or alternately in a solid state memory device such as a Rom chip set 32. A processor 34 in accordance with the data processing program is present. The processor 34 may be a digital data signal microprocessor and its related and associated circuit elements as is found and used ubiquitously in the small computer field. The processor 34 is electronically connected with the energy signals receiving means 12, the reading and writing means 14, the video information displaying and selecting means 22, the audio output producing means 24 and the digital data storing means 30. The processor 34 is enabled to receive, store, organize, and output audio and video information in accordance with manual selections through the video information displaying and selecting means 22 as guided by the data processing program. As shown in FIG. 8 sockets 64 may be made available for a microphone for voice input or other audio source.

The electromagnetic wave energy signals receiving means 12 provides a collapsible radio antenna 12 so as to enable receiving of weak radio signals, and also preferably provides an ear phone 62 or head phone for transferring the audio output directly to one or both ears of the user of the device 10 so as to provide private listening and usage of the device 10.

A small portable hand-held scanner 36 has a capacity to scan both text and graphics which can then be saved in the processor 34.

A touch sense keyboard 38 is enabled by the video information displaying and selecting means 22, to manually input titles under which recorded material may be saved. A data base search engine 40 is enabled to search single words, multiple words and parts of words, so as to receive the digital data without the necessity for recalling exact titles.

A plurality of control function buttons 42 are provided. Such buttons may constitute real electrical switches or simulated switches for touch sense control. The control function buttons 42 are electrically connected to the reading and writing means 14 for performing functions of stopping play, ejecting the compact disk 16, the video game disk 18 and the DVD movie disk 20, pausing play, starting play, recording, selecting a track, fast forwarding, rewinding and repeating a track on a music compact disk 16.

A cursor moving device 44, such as a computer mouse, is electrically connected to the video information displaying and selecting means 22.

The data processing program provides a visual choice menu for selecting action options, the menu comprising a first choice 46 of: "FILE," "EDIT," "VIEW," "OPTIONS," and "HELP" selections. The data processing program provides a visual choice menu for selecting action options, the menu comprises a second choice under the "FILE" option of "SAVE AS," 47 "OPEN," 48 and "DELETE 50."

The data processing program provides a visual choice menu for selecting action options, the menu comprises a second choice (not shown) under the "EDIT" option of "MEMORY DRIVES," "CUT," "COPY" and "PASTE."

The data processing program provides a visual choice menu for selecting action options, the menu comprises a second choice (not shown) under the "VIEW" option of "DISC/TRACK INFO," and "STATUS BAR."

The data processing program provides a visual choice menu for selecting action options, the menu comprises a third choice 51 under the "SAVE AS" option of "MUSIC CD 1–100," "AUDIO CD 1–100," "RADIO 1–100," "VOICE 1–1 "VIDEO GAME 1–100," "DVD MOVIE 1–100," and "SCAN TEXT 1–100."

In use, the device 10 may be tuned to a radio program or a CD track of an inserted Music CD 16, an inserted Video Game Disk 18, an inserted DVD Movie Disk 20 or other audio material or text information. These sources of information may be recorded permanently on the magnetic domain storage hard drive or read-write compact disk read and write memory device or other memory device means 30.

It is clear from the foregoing, that the device 10 is able to record information from seven different sources. It can record information from the radio 12, music compact disk 16, audio compact disk (not shown), video game disk 18, DVD movie disk 20, voice information, through the use of the microphone 62, or scanned information through the use of the portable hand-held scanner 36. Except for a music CD 16, all other six sources of information can be recorded by pressing the PLAY AND RECORD touch sensitive function buttons. When these buttons are pressed the SAVE AS 47 secondary choice opens up the seven choices to record information. However, if one wants to provide a unique name for a recording, this can be done through the use of the touch-sense keyboard option 38. In the case of recording a Music CD one must first go to the "VIEW" option to highlight the track or tracks to be recorded. All seven types of information are stored in separate indexed locations (not shown) and are later retrieved by selecting from one of these seven indexes. All seven types of information stored, can be deleted through the use of the secondary choice option of "DELETE 50."

Eight function button keys 52, 53 are provided in which a first set of four of the function button keys 52 are up arrow, down arrow, right arrow and left arrow used in conjunction with the cursor moving device 44 to play the video game disk 18. A second set of four of the function button keys 53 are zoom in, zoom out, still frame and slow motion replay used with the DVD movie disk 20.

A docking station 54 is electrically connected to the processor 34 so that information saved in the processor 34 can be uploaded onto a personal computer. Also, the same types of information saved in the processor 34, can be downloaded from a personal computer, and saved in the processor 34.

An on/off switch 56 is electrically connected to the processor 34. A cover 58 having a drive motor (not shown) is electrically controlled by the on/off switch 56. When the on/off switch 56 is turned to the "on" position, the drive motor will cause the cover 58 to extend over the video information displaying and selecting means 22 to protect the video information displaying and selecting means 22. When the on/off switch 56 is turned to the "off" position, the drive motor will cause the cover 58 to retrack back from the video information displaying and selecting means 22.

Referring to FIG. 8, a stylus 60 is electrically connected to the video information displaying and selecting means 22, whereby the stylus 60 can be utilized in place of the cursor moving device 44.

The foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

I claim:

1. A portable entertainment device comprising:
    means for receiving electromagnetic wave energy signals and for converting the signals into digital data signals;
    means for digitally reading and writing on a compact disk;
    means for displaying and selecting video information using menu graphics;
    means for producing an audio output;
    means for storing digital data using the compact disk;
    a data processing program, within said digital data storing means;
    a processor for processing signals in accordance with said data processing program, said processor being electronically connected with said energy signals receiving means, said reading and writing means, said video information displaying and selecting means, said audio output producing means and said digital data storing means, wherein said processor in enabled to receive, store, organize and output audio and video information in accordance with manual selections through said video information displaying and selecting means as guided by said data processing program; and a cursor moving device electrically connected to said video information displaying and selecting means.

2. The device as recited in claim 1, further including:
    a touch sense keyboard enabled by said video information displaying and selecting means, to enable the manual input of titles under which recorded material may be saved; and
    a data base with a search capability, enabled to search single words, multiple words, and parts of words, so a to receive the digital data without the necessity for recalling exact titles.

3. The device as recited in claim 1, further including
    a plurality of control function buttons, said control function buttons being electrically connected to said reading and writing means for performing functions of stopping play, ejecting the compact disk, the video game disk and the DVD movie disk, pausing play, starting play, recording, selecting a track, fast forwarding, rewinding and repeating a track on a music compact disk.

4. The device as recited in claim 1, wherein said data processing program provides a visual choice menu for selecting action options, the menu comprising a first choice of:
"FILE," "EDIT," "VIEW," "OPTIONS," and "HELP" selections.

5. The device as recited in claim 4, wherein said data processing program provides a visual choice menu for selecting action options, the menu comprising a second choice under the "FILE" option of: "SAVE AS," "OPEN" and "DELETE."

6. The device as recited in claim 4, wherein said data processing program provides a visual choice menu for selecting action options, the menu comprising a second choice under the "EDIT" option of: "MEMORY DRIVES," "CUT," "COPY" and "PASTE."

7. The device as recited in claim 4, wherein said data processing program provides a visual choice menu for selecting action options, the menu comprising a second choice under the "VIEW" option of: "DISC/TRACK INFO" and "STATUS BAR."

8. The device as recited in claim 5, wherein said data processing program provides a visual choice menu for selecting action options, the menu comprising a third choice under the "SAVE AS" option of: "MUSIC CD 1–100," "AUDIO CD 1–100," "RADIO 1–100," "VOICE 1–100," "VIDEO GAME 1–100," "DVD MOVIE 1–100" and "SCAN TEXT 1–100."

9. The device as recited in claim 1, wherein said means for digitally reading and writing on a compact disk provides for digitally reading a video game disk and said means for storing digital data using the compact disk provides for storing digital data using the video game disk.

10. The device as recited in claim 1, wherein said means for digitally reading and writing on a compact disk provides for digitally reading a DVD movie disk and said means for storing digital data using the compact disk provides for storing digital data using the DVD movie disk.

11. The device as recited in claim 1, further including eight function button keys in which a first set of four of said function button keys presents up arrow, down arrow, right arrow and left arrow used in conjunction with said cursor moving device to play the video game disk, while a second set of four of said function button keys presents zoom in, zoom out, still frame and slow motion replay used with the DVD movie disk.

12. The device as recited in claim 1, further including a small portable hand-held scanner electrically connected to said processor, has a capacity to scan both text and graphics which can then be saved in the said processor.

13. The device as recited in claim 1, further including a docking station electrically connected to said processor, so that information saved in said processor can be uploaded onto a personal computer and the same types of information saved in said processor, can be downloaded into said processor, from a personal computer.

14. The device as recited in claim 1, further including:
an/off switch electrically connected to said processor and a cover having a drive motor electrically controlled by said on/off switch, so that when said on/off switch is turned on said drive motor will cause said cover to extend over said video information displaying and selecting means to protect said video information displaying and selecting means and when said on/off switch is turned off said drive motor will cause said cover to retract back from said video information displaying and selecting means.

15. The device as recited in claim 1, further including a stylus electrically connected to said video information displaying and selecting means, whereby said stylus can be utilized in place of said cursor moving device.

* * * * *